(12) United States Patent
Duffy et al.

(10) Patent No.: US 11,240,878 B2
(45) Date of Patent: Feb. 1, 2022

(54) SYSTEM AND METHOD FOR TEST AND/OR CALIBRATION OF MULTI-CHANNEL RF COMMUNICATION DEVICES

(71) Applicant: Keysight Technologies, Inc., Santa Rosa, CA (US)

(72) Inventors: Stephen G. Duffy, Santa Rosa, CA (US); Xu Zhao, Beijing (CN); Hong-Wei Kong, Beijing (CN); Ya Jing, Beijing (CN)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 17/145,768

(22) Filed: Jan. 11, 2021

(65) Prior Publication Data

US 2021/0136867 A1 May 6, 2021

Related U.S. Application Data

(62) Division of application No. 15/520,572, filed as application No. PCT/US2014/061403 on Oct. 20, 2014, now Pat. No. 10,917,937.

(51) Int. Cl.
*H04W 88/06* (2009.01)
*H04W 76/15* (2018.01)
(Continued)

(52) U.S. Cl.
CPC ........... *H04W 88/06* (2013.01); *H04W 24/06* (2013.01); *H04W 36/14* (2013.01); *H04W 36/24* (2013.01);
(Continued)

(58) Field of Classification Search
CPC ..... H04W 88/06; H04W 76/15; H04W 24/06; H04W 36/14; H04W 36/24; H04W 36/28;
(Continued)

(56) References Cited

U.S. PATENT DOCUMENTS 4,813,001 A 3/1989 Sloane
7,181,205 B1 2/2007 Scott et al.
(Continued)

OTHER PUBLICATIONS

International Search Report and Written Opinion dated Jan. 21, 2015.

*Primary Examiner* — Nguyen T Vo (57) ABSTRACT

A test system includes: a signal processor configured to generate a plurality of orthogonal baseband sequences; a signal generator configured to supply the plurality of orthogonal baseband sequences to a corresponding plurality of RF transmitters of a device under test (DUT), wherein the RF transmitters each employ the corresponding orthogonal baseband sequence to generate a corresponding RF signal on a corresponding channel among a plurality of channels of the DUT such that the RF transmitters output a plurality of orthogonal RF signals at a same time; a combiner network configured to combine the plurality of orthogonal RF signals and to output a single signal under test; and a single channel measurement instrument configured to receive the single signal under test and to measure independently therefrom at least one characteristic of each of the RF transmitters. Orthogonal RF test signals may be used similarly to test RF receivers of the DUT.

20 Claims, 5 Drawing Sheets

(51) Int. Cl.
  *H04W 36/14* (2009.01)
  *H04W 24/06* (2009.01)
  *H04W 36/24* (2009.01)
  *H04W 36/28* (2009.01)
  *H04W 88/02* (2009.01)

(52) U.S. Cl.
  CPC ............ *H04W 36/28* (2013.01); *H04W 76/15* (2018.02); *H04W 88/02* (2013.01)

(58) Field of Classification Search
  CPC ... H04W 88/02; H04B 17/0085; H04B 17/20; H04B 17/121; H04B 17/29; H04B 17/30
  See application file for complete search history.

(56) References Cited

U.S. PATENT DOCUMENTS

| | | |
|---|---|---|
| 7,286,604 B2 | 10/2007 | Shattil |
| 7,349,447 B1 | 3/2008 | Sung et al. |
| 7,826,343 B2 | 11/2010 | Krasner |
| 8,040,936 B2 | 10/2011 | Tiedemann, Jr. |
| 8,269,569 B2 | 9/2012 | Watanabe et al. |
| 8,312,329 B1 | 11/2012 | Yellapantula et al. |
| 8,437,715 B2 | 5/2013 | Flickinger et al. |
| 8,754,631 B2 | 6/2014 | Watanabe et al. |
| 2007/0070691 A1 | 3/2007 | Walvis et al. |
| 2007/0070881 A1 | 3/2007 | Olgaard et al. |
| 2010/0007355 A1 | 1/2010 | Olgaard et al. |
| 2010/0123471 A1* | 5/2010 | Olgaard .................. H04L 1/243 324/750.3 |
| 2012/0054565 A1 | 3/2012 | Huang et al. |
| 2013/0188509 A1 | 7/2013 | Mellein et al. |
| 2014/0160955 A1 | 6/2014 | Lum et al. |

* cited by examiner

SYSTEM AND METHOD FOR TEST AND/OR CALIBRATION OF MULTI-CHANNEL RF COMMUNICATION DEVICES

CROSS-REFERENCE TO RELATED APPLICATIONS

The present application is a divisional application of U.S. Pat. No. 10,917,937 under 35 U.S.C. § 120 naming to Steve G. Duffy, et al. inventors. U.S. Pat. No. 10,917,937 is a National Stage Application under 35 U.S.C. § 371 of, and claims priority under 35 U.S.C. § 121 from, International Publication No. WO2016064376A1. The entire disclosures of U.S. Pat. No. 10,917,937 and International Publication U.S. Pat. No. 10,917,937 are specifically incorporated herein by reference.

BACKGROUND

In general RF communication systems and devices, like other electronics, require testing and, in some cases, calibration. Testing and calibration can present challenges in the case of an RF communication system or device which supports multiple transmission (Tx) and reception (Rx) channels.

Some traditional solutions employ a single-channel measurement instrument to test and calibrate each channel of a multi-channel RF communication device individually, one-by-one, in sequence. However, these solutions have some drawbacks. First, the repeated connection and disconnection of the single-channel measurement instrument to the multi-channel RF communication device under test (DUT) using RF connectors will influence the testing accuracy and repeatability. Second, as the number of transmission and/or reception channels increases, the time required to perform test and calibration also increases. In particular, in the case of massive multi-input, multi-output (MIMO) communication systems which are now being developed and deployed, the number of channels is very large (in many cases more than 64) and as a result testing each of these channels one-by-one is very time consuming and in fact as the number of channels increases, the time required can be prohibitive.

Some other solutions use multiple test instruments, or a multi-channel test instrument, to test channels in parallel. However, a disadvantage of this approach is that when the number of channels is very large, the test instruments, or multi-channel test instrument, becomes too expensive and even impractical when the number of channels is much greater than 8.

Thus it would be desirable to provide a more convenient and more reliable method and system to test and calibrate the performance of a multi-channel RF communication system or device.

SUMMARY

In accordance with a representative embodiment, a test system, comprises: a test signal generator, comprising: a single channel signal source configured to output a single channel signal, and a phase shift network configured to receive the single channel signal and in response thereto to output a plurality of RF test signals in parallel with each other. The phase shift network is further configured to shift a phase of one or more of the RF test signals so as to make at least a selected one of the RF test signals orthogonal to the other RF test signals. The test system further comprises a combiner network having a plurality of inputs each configured to receive one of a plurality of receive signals, each receive signal being produced from a corresponding one of a plurality of RF receivers of a device under test (DUT) in response to the RF test signals. The combiner is configured to combine the plurality of receive signals and to output a combined output signal. The test system further comprises a single channel measurement instrument configured to receive the combined output signal and to measure therefrom at least one characteristic of each of the RF receivers.

In accordance with another representative embodiment, a test system, comprises: a test signal generator, comprising: a single channel signal source, comprising a processor and a memory, which stores instructions, which when executed by the processor cause the processor to: generate a plurality of RF test signals in parallel with each other, wherein at least one of the RF test signals is orthogonal to the other RF test signals at a given time; apply each of the plurality of RF test signals to a corresponding one of the plurality of RF receivers of the DUT; combine a plurality of receive signals each produced from one of the plurality of RF receivers of the DUT in response to the corresponding one of the plurality of RF test signals, to output a combined output signal; provide the combined output signal to a test instrument; and employ the test instrument to independently measure at least one characteristic of each of the RF receivers from the combined output signal.

In yet another example embodiment, a method is provided for testing a device under test (DUT) including a plurality of RF receivers. The method comprises: generating a plurality of RF test signals in parallel with each other, wherein at least one of the RF test signals is orthogonal to the other RF test signals at a given time; applying each of the plurality of RF test signals to a corresponding one of the plurality of RF receivers of the DUT; combining a plurality of received signals each produced from one of the plurality of RF receivers of the DUT in response to the corresponding one of the plurality of RF test signals, to output a combined output signal; and providing the combined output signal to a test instrument; and employing the test instrument to independently measure at least one characteristic of each of the RF receivers from the combined output signal.

BRIEF DESCRIPTION OF THE DRAWINGS

The example embodiments are best understood from the following detailed description when read with the accompanying drawing figures. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

Figure 1:
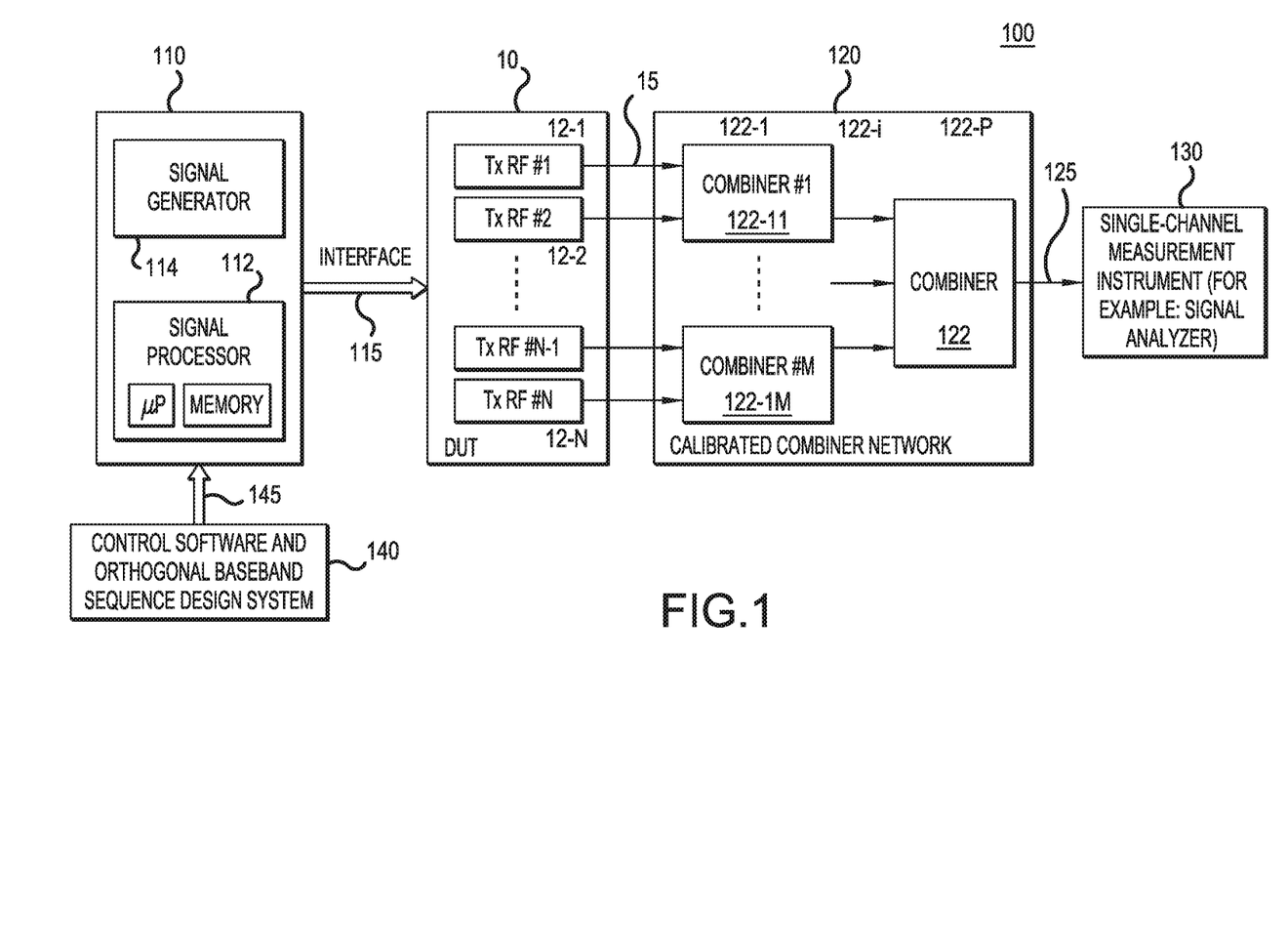
FIG. 1 illustrates a first example embodiment of a system for testing a multi-channel RF system or device under test (DUT).

FIG. 1 illustrates a first example embodiment of a test system 100 for testing a multi-channel RF system or device under test (DUT) 10. Test system 100 includes a signal source 110, a combiner network 120, and a single channel measurement instrument 130. Test system 100 may also further include a signal design system 140. In particular, test system 100 is an embodiment of a system for testing and/or calibrating a plurality of RF transmitters of a multi-channel RF device or system, specifically a multi-channel RF communication device or system.

In the example embodiment, DUT 10 is connected to signal source 110 via an interface 115. Here, it is assumed that DUT 10 includes a plurality (N) of RF transmitters 12, e.g., 12-1, 12-2, . . . , 12-N which are capable of operating independently from each other. Each RF transmitter 12 receives corresponding data, for example in the form of a baseband sequence, and is capable of generating therefrom a RF transmit signal 15, wherein one or more parameters of RF transmit signal 15 (e.g., a phase or frequency shift or modulation) is changed depending on the data so that the data is represented in RF transmit signal 15. In the example embodiment, interface 115 may comprise a baseband interface for receiving a plurality of baseband sequences, and/or may comprise an optical interface wherein the baseband sequences are provided on one or more optical signal carriers. In some embodiments, DUT 10 may be a massive multi-input, multi-output (MIMO) communication system having many RF transmitters 12. In some embodiments where DUT 10 is a MIMO system, DUT 10 may have at least N=64 RF transmitters 12-1 . . . 12-N. In some embodiments, DUT 10 may have N=400 or more RF transmitters 12-1 . . . 12-N.

In the illustrated embodiment, signal source 110 includes a signal processor 112 and a signal generator 114. Signal processor 112 may further include a digital microprocessor and memory, which may include volatile and/or nonvolatile memory, including random access memory (RAM), read only memory—for example electrically erasable programmable read only memory (EEPROM), FLASH memory, etc. In some embodiments, the memory may store instructions to be executed by the digital microprocessor to cause the digital microprocessor to perform one or more algorithms for generating a plurality of baseband test sequences to be supplied to DUT 10, as discussed in greater detail below. Signal processor 112 may also include firmware, one or more application specific integrated circuits (ASICs), digital signal processors (DSPs), programmable gate arrays, etc.

In the illustrated embodiment, combiner network 120 is configured with a plurality of combiner stages 122-1, . . . , 122-i, . . . , 122-P, wherein each combiner stage 122-i may include one or more combiners 122. In the illustrated embodiment, each combiner 122 is a two-input device. Other configurations of a combiner network are possible. For example, in other embodiments, a combiner network may include a plurality of stages of four-input devices, or even a single stage with one N-input device. Combiner network 120 is configured to output a single signal under test 125 produced by combining RF transmit signals 15 output by RF transmitters 12-1 . . . 12-N.

In a beneficial feature, combiner network 120 may be calibrated so that the transfer function (e.g., signal amplitude loss and or phase shift) from each RF transmit signal 15 to the output signal under test 125 through combiner network 120 is known absolutely and/or with respect to each other (i.e., the losses and phase shifts for the different RF transmit signals 15 are known with respect to each other). Calibration data for the various RF transmit signals 15 may be stored in memory, for example a memory of single channel measurement instrument 130, such that single channel measurement instrument 130 may produce calibrated measurement or test results for each of the RF transmitters 12-1 . . . 12-N of DUT 10.

Single channel measurement instrument 130 is connected to an output of combiner network 120 to receive signal under test 125 therefrom. In some embodiments, single channel measurement instrument 130 may comprise an RF test instrument. In some embodiments, single channel measurement instrument 130 may comprise a single channel signal analyzer, e.g., an RF signal analyzer, such as a spectrum analyzer. However, in general, single channel measurement instrument 130 may be any test or measurement instrument which can measure one or more parameters of any RF transmit signal 15 generated an RF transmitter 12 by DUT 10. In some embodiments, test system 100 may include more than one single channel measurement instrument which may operate in parallel to measure different parameters of single signal under test 125 output by combiner network 120.

In general, as noted above, DUT 10 includes a plurality of RF transmitters 12-1 . . . 12-N which all may operate independently from each other. Accordingly, in general non-orthogonal operation, RF transmit signals 15 transmitted by RF transmitters 12-1 . . . 12-N may occupy the same spectral space at the same time as each other and could interfere which each other. In that case, it could be difficult or impossible to separately or individually test or measure any parameter of any one of the RF transmitters 12-1 . . . 12-N from the combined single signal under test 125 output by combiner network 120.

To address this issue, as discussed in greater detail below, in test system 100, signal generator 114 is configured to supply a corresponding plurality of orthogonal or substantially orthogonal baseband sequences to RF transmitters 12-1 . . . 12-N of DUT 10. As a result, the RF transmit signals 15 generated by RF transmitters 12-1 . . . 12-N of DUT 10 are also orthogonal or substantially orthogonal to each other. Thus, even though the RF transmit signals 15 are combined by combiner network 120 to produce a single signal under test 125 output by combiner network 120, single channel measurement instrument 130 may resolve or separate each individual RF transmit signal 15 from the signal under test 125 so as to individually test or measure one or more parameters of any one of the RF transmitters 12-1 . . . 12-N from the combined single signal under test 125 output by combiner network 120. An example operation of test system 100 will now be described to better illustrate these principles.

In operation, signal processor 112 generates a plurality of orthogonal baseband sequences. Although it is understood that as a practical matter the plurality of orthogonal baseband sequences in some embodiments may not be perfectly orthogonal to each other and may have some small residual non-orthogonal components, in the description to follows orthogonal or substantially orthogonal baseband sequences will be referred to generally as "orthogonal baseband sequences."

Figure 2A:
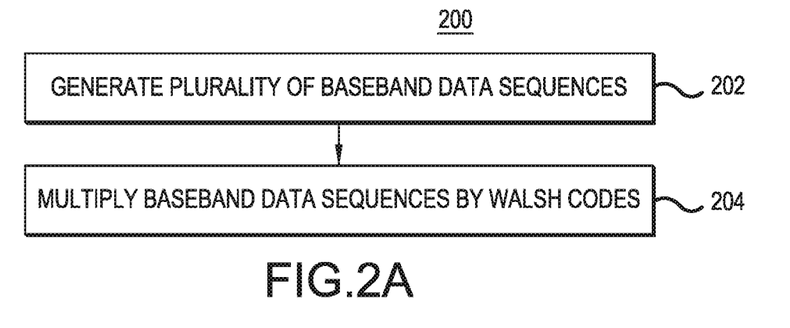
FIGS. 2A, 2B and 2C illustrate three embodiments of methods of generating orthogonal test signals for testing a multi-channel RF system or device under test (DUT).
Figure 2B:
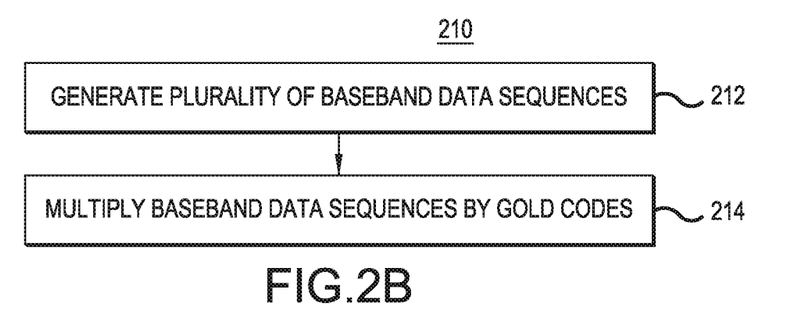
Figure 2C:
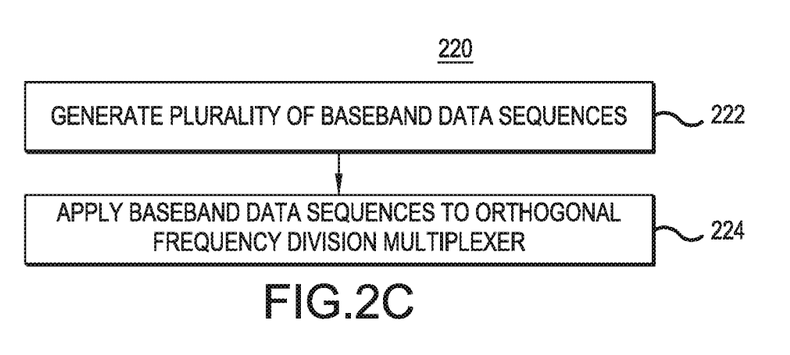

FIGS. 2A, 2B and 2C illustrate three embodiments of methods 200, 210 and 220, respectively, of generating orthogonal baseband sequences for testing a multi-channel RF system or device under test (DUT).

Method 200 includes an operation 202 of generating a plurality of baseband data sequences. In some embodiments, each of the plurality of baseband data sequences may comprises a pseudorandom bitstream. Method 200 also includes an operation 204 of multiplying the baseband data sequences by a Walsh code or Walsh matrix to produce a plurality of orthogonal baseband sequences.

Method 210 includes an operation 212 of generating a plurality of baseband data sequences. In some embodiments, each of the plurality of baseband data sequences may comprises a pseudorandom bitstream. Method 210 also includes operation 214 of multiplying each of the baseband data sequences by a corresponding Gold code to produce a plurality of orthogonal baseband sequences.

Method 220 includes an operation 222 of generating a plurality of baseband data sequences. In some embodiments, each of the plurality of baseband data sequences may comprises a pseudorandom bitstream. Method 200 also includes operation 224 of applying the baseband data sequences to an orthogonal frequency divisional multiplexer to generate an orthogonal frequency division multiplexed (OFDM) signal comprising a plurality of orthogonal baseband sequences.

Although methods 200, 210, and 220 have been illustrated as examples, other methods of generating a plurality of orthogonal baseband sequences are contemplated.

In some embodiments, one or more of the operations of methods 200, 210 or 220 may be performed by a digital microprocessor and memory of signal processor 112, as discussed above. For example, in some embodiments the digital microprocessor may execute an algorithm according to instructions stored in memory (e.g., nonvolatile memory) to generate the plurality of baseband data sequences, for example pseudorandom bitstreams. In some embodiments, the digital microprocessor may execute an algorithm according to instructions stored in memory (e.g., nonvolatile memory) to generate Walsh codes or a Walsh matrix for the baseband data sequences. In some embodiments, the digital microprocessor may execute an algorithm to multiply the Walsh codes or Walsh matrix with the baseband data sequences to generate the plurality of orthogonal baseband sequences.

In some embodiments, the baseband data sequences or the orthogonal baseband sequences may be stored in memory, for example a nonvolatile memory such as an EEPROM or FLASH device, and may be read from the nonvolatile memory by the digital microprocessor.

In some embodiments, the baseband data sequences, Walsh codes, and/or the resultant orthogonal baseband sequences may be designed by signal design system 140 and communicated therefrom to signal source 110, and in particular signal processor 112. In some embodiments, signal design system 140 may comprise a general purpose computer including one or more digital microprocessors, memory (including volatile and/or nonvolatile memory), data storage (e.g., a hard disk or FLASH memory drive), one or more interfaces 145 (e.g., an Ethernet port, wireless network interface, etc.) for communicating with signal source 110, and a user interface which may include one or more of a display, keyboard, keypad, touchscreen, mouse, trackball, microphone, etc. In some embodiments, a user may execute one or more software algorithms stored in memory and/or data storage of signal design system 140 to design or set parameters for the baseband data sequences, Walsh codes, and/or the resultant orthogonal baseband sequences employed by signal processor 112, and may communicate this data to signal processor 112 via interface 145. In some embodiments, signal design system 140 may only be connected to signal source 110 during a system design or system configuration phase for test system 100.

In some embodiments, signal design system 140 and all of the data and parameters necessary for operation of signal source 110 and signal processor 112 may be stored in nonvolatile memory in signal source 110 or signal processor 112.

Signal generator 114 is configured to supply the plurality of orthogonal baseband sequences to the corresponding plurality of RF transmitters 12 of DUT 10 via interface 115. In some embodiments, signal generator 114 may be configured to continuously supply the plurality of orthogonal baseband sequences to the corresponding plurality of RF transmitters 12-1 . . . 12-N of DUT 10 via interface 115 during testing of DUT 10. In other embodiments, the orthogonal baseband sequences may comprise relatively long data patterns of fixed length which are transmitted over and over repeatedly by RF transmitters 12-1 . . . 12-N. In that case, in some embodiments, signal generator 114 may be configured to supply the plurality of orthogonal baseband sequences to DUT 10 one time via interface 115, and DUT 10 may store the orthogonal baseband sequences in internal memory of DUT 10 and apply each orthogonal baseband sequence to a corresponding RF transmitter 12 during testing.

In some embodiments, signal generator 114 may be configured to supply the plurality of orthogonal baseband sequences to DUT 10 via interface 115 sequentially, one at a time. In some embodiments, signal generator 114 may be configured to supply the plurality of orthogonal baseband sequences to the corresponding plurality of RF transmitters 12-1 . . . 12-N of DUT 10 via interface 115 in parallel with each other.

In some embodiments, interface 115 may include an electrical interface. In that case, in some embodiments, signal generator 114 may be configured to supply the plurality of orthogonal baseband sequences to DUT 10 via the electrical interface as baseband data patterns. In some embodiments, interface 115 may include an optical interface. In that case, signal generator 114 may be configured to modulate the orthogonal baseband sequences onto one or more optical carriers supplied to DUT via the optical interface.

RF transmitters 12-1 ... 12-N each employ the corresponding orthogonal baseband sequence to generate a corresponding RF transmit signal 15 on a corresponding channel among a plurality of channels of DUT 10, such that RF transmitters 12-1 ... 12-N output a plurality of orthogonal RF transmit signals 15 at the same time as each other.

Combiner network 120 combines the plurality of orthogonal RF transmit signals 15 produced by RF transmitters 12-1 ... 12-N to produce and output a single signal under test 125. Combiner network maintains or substantially maintains the orthogonality between the RF transmit signals 15 produced by RF transmitters 12-1 ... 12-N when combining the RF transmit signals 15 to produce signal under test 125.

Single channel measurement instrument 130 receives single signal under test 125 and therefrom measures independently at least one characteristic of each of RF transmitters 12-1 ... 12-N of DUT 10. As noted above since the RF transmit signals 15 produced by RF transmitters 12-1 ... 12-N which are included in signal under test 125 are all orthogonal or substantially orthogonal to each other, mutual interference is minimal and single channel measurement instrument 130 is able to separate or resolve each individual RF transmit signal 15 to measure at least one characteristic of the corresponding RF transmitter 12. In some embodiments, single channel measurement instrument 130 sequentially measures one or more characteristics of RF transmitters 12-1 ... 12-N, one at a time. In various embodiments, single channel measurement instrument 130 may measure one or more of the following characteristics of each RF transmitter 12: output power level, occupied bandwidth, signal-to-noise ratio (SNR), harmonic output levels, harmonic distortion, signal-to-noise-plus-interference ratio (SNIR), etc.

Figure 3:
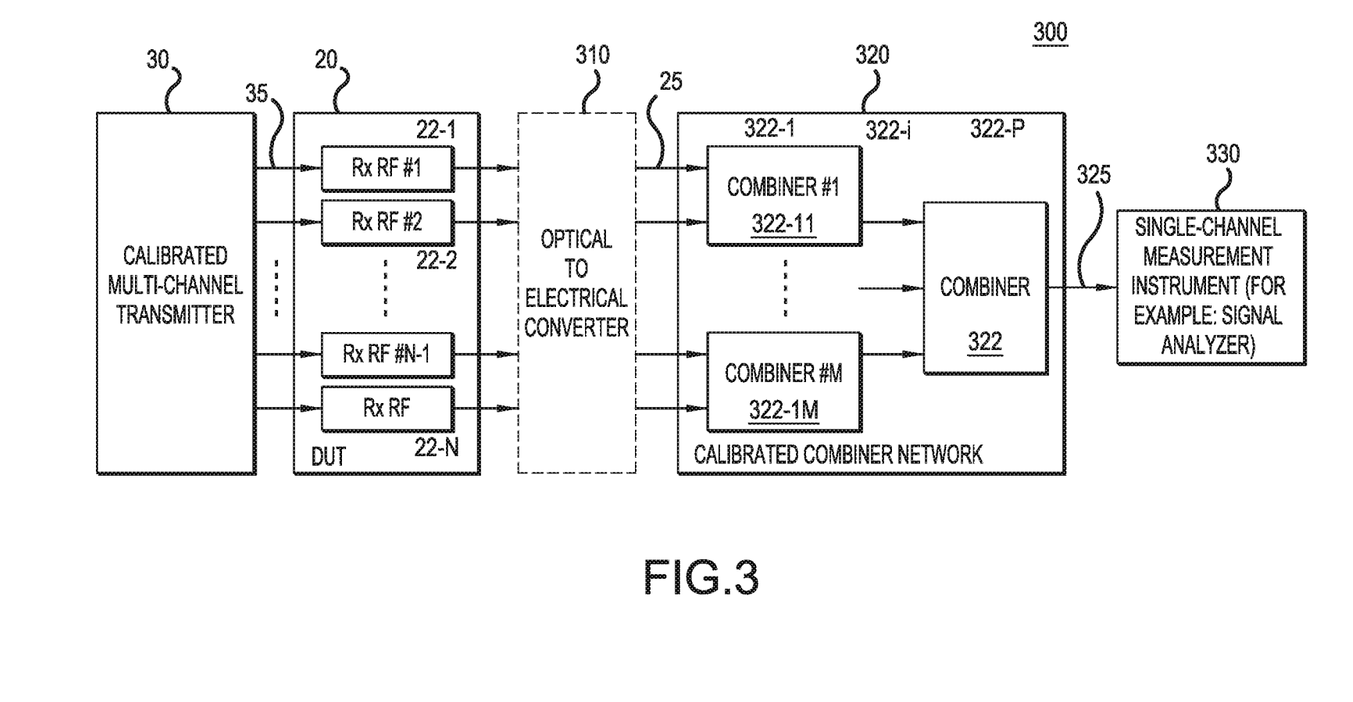
FIG. 3 illustrates a second example embodiment of a system for testing a multi-channel RF system or device under test (DUT).

FIG. 3 illustrates a second example embodiment of a test system 300 for testing a multi-channel RF device under test (DUT) 20. Test system 300 includes a combiner network 320 and a single channel measurement instrument 330. Test system 300 may also further include, optionally, an optical-to-electrical converter 310. In particular, test system 300 is an embodiment of a system for testing and/or calibrating a plurality RF receivers of a multi-channel RF device or system, specifically a multi-channel RF communication device or system.

Test system 300 assumes the availability of a calibrated multi-channel transmitter 30 which may be configured to generate and output a plurality of RF test signals 35 in parallel with each other, wherein at least one of the RF test signals 35 is orthogonal to the other RF test signals at a given time. In some embodiments, calibrated multi-channel transmitter 30 may be configured to generate a plurality of RF test signals 35 in parallel with each other, wherein each of the RF test signals 35 is orthogonal to all of the other RF test signals at a given time. In some embodiments, calibrated multi-channel transmitter 30 may be a transmission portion of DUT 20 which includes many RF transmitters, for example as illustrated in FIG. 1.

Here, it is further assumed that DUT 20 includes a plurality (N) of RF receivers 22, e.g., 22-1, 22-2, ..., 22-N which are capable of operating independently from each other. Each RF receiver 22 receives a corresponding RF test signal 35 from calibrated multi-channel transmitter 30, wherein one or more parameters of RF test signal 35 (e.g., an amplitude, phase, or frequency shift or modulation) is changed depending on data which it transmits, so that the data is represented in the transmit RF signal. In some embodiments, DUT 20 may be a massive multi-input, multi-output (MIMO) communication system having many RF receivers 22-1 ... 22-N. In some embodiments where DUT 20 is a MIMO system, DUT 20 may have at least N=64 RF receivers 22-1 ... 22-N. In some embodiments, DUT 10 may have N=400 or more RF receivers 22-1 ... 22-N.

In the example embodiment, each of the RF receivers 22-1 ... 22-N of DUT 20 outputs an optical output signal comprising a baseband sequence provided on one or more optical signal carriers. In particular, the baseband sequences output by RF receivers 22-1 ... 22-N of DUT 20 are orthogonal or substantially orthogonal to each other. The optical output signals output by RF receivers 22-1 ... 22-N of DUT 20 are provided to combiner network 320 via optional optical-to-electrical converter 310. Optical-to-electrical converter 310 converts the optical output signals from RF receivers 22-1 ... 22-N of DUT 20 into RF or intermediate frequency (IF) receive signals 25 which carry the orthogonal baseband sequences and which are then provided from optical-to-electrical converter 310 to combiner network 320.

In other embodiments, RF receivers 22-1 ... 22-N of DUT 20 may include RF or intermediate frequency (IF) outputs. In that case, the orthogonal baseband sequences may be output from RF receivers 22-1 ... 22-N on RF or IF carriers, in which case optical-to-electrical converter 310 may be omitted and the RF or IF receive signals 25 may be provided directly from RF receivers 22-1 ... 22-N of DUT 20 to combiner network 320.

In the illustrated embodiment, combiner network 320 is configured with a plurality of combiner stages 322-1, ..., 322-i, ..., 322-P, wherein each combiner stage 322-i may include one or more combiners 322. In the illustrated embodiment, each combiner 322 is a two-input device. Other configurations of a combiner network are possible. For example, in other embodiments, a combiner network may include a plurality of stages of four-input devices, or even a single stage with one N-input device. Combiner network 320 is configured to output a single combined output signal 325 produced by combining receive signals 25 output by RF receivers 22-1 ... 22-N.

In a beneficial feature, combiner network 320 may be calibrated so that the transfer function (e.g., signal amplitude loss and or phase shift) from each RF receive signal 25 to the single combined output signal 325 through combiner network 320 is known absolutely and/or with respect to each other (i.e., the losses and phase shifts for the different RF receive signals 25 are known with respect to each other). Calibration data for the various RF receive signals 25 may be stored in memory, for example a memory of single channel measurement instrument 130, such that single channel measurement instrument 130 may produce calibrated measurement or test results for each of the RF receivers 22-1 ... 22-N of DUT 20.

Single channel measurement instrument 130 is connected to an output of combiner network 320 to receive single combined output signal 325 therefrom. In some embodiments, single channel measurement instrument 130 may comprise an RF test instrument. In some embodiments, single channel measurement instrument 130 may comprise a single channel signal analyzer, e.g., an RF signal analyzer, such as a spectrum analyzer. However, in general, single channel measurement instrument 130 may be any test or measurement instrument which can select (based on the orthogonal properties of the signal) and measure one or more parameters of any RF receive signal 25 generated an RF receiver 22 by DUT 20. In some embodiments, test system 300 may include more than one single channel measurement instrument which may operate in parallel to measure different parameters of single combined output signal 325 output by combiner network 320.

In general, as noted above, DUT 20 includes a plurality of RF receivers 22-1 . . . 22-N which all may operate independently from each other.

Accordingly, in general (non orthogonal) operation, RF signals received by RF receivers 22-1 . . . 22-N may occupy the same spectral space at the same time as each other and could interfere which each other. In that case, it could be difficult or impossible to separately or individually test or measure any parameter of any one of the RF receivers 22-1 . . . 22-N from the single combined output signal 325 output by combiner network 320.

To address this issue, as discussed in greater detail below, in test system 300, calibrated multi-channel transmitter 30 is configured to supply a corresponding plurality of orthogonal or substantially orthogonal RF test signals 35 to RF receivers 22-1 . . . 22-N of DUT 20. As a result, the receive signals 25 generated by RF receivers 22-1 . . . 22-N of DUT 20 are also orthogonal or substantially orthogonal to each other. Thus, even though the receive signals 25 are combined by combiner network 320 to produce and output a single combined output signal 325, single channel measurement instrument 130 may resolve or separate each individual receive signal 25 from the single combined output signal 325 so as to individually test or measure one or more parameters of any one of the RF receivers 22-1 . . . 22-N from the single combined output signal 325 output by combiner network 320. An example operation of test system 300 will now be described to better illustrate these principles.

Calibrated multi-channel transmitter 30 is configured to supply a corresponding plurality of orthogonal or substantially orthogonal RF test signals 35 to RF receivers 22-1 . . . 22-N of DUT 20.

RF receivers 22-1 . . . 22-N each process the corresponding orthogonal RF test signal to generate a corresponding receive RF test signal 35 on a corresponding channel among a plurality of channels of DUT 20, such that RF receivers 22-1 . . . 22-N output a plurality of orthogonal RF receive signals 25 at the same time as each other.

Combiner network 320 combines the plurality of receive signals 25 produced by RF receivers 22-1 . . . 22-N to produce the single combined output signal 325. Combiner network maintains or substantially maintains the orthogonality between the RF receive signals 25 produced by RF receivers 22-1 . . . 22-N when combining the RF receive signals 25 to produce single combined output signal 325.

Single channel measurement instrument 130 receives single combined output signal 325 and therefrom measures independently at least one characteristic of each of the RF receivers 22-1 . . . 22-N of DUT 20. As noted above since the RF test signals 35 produced by calibrated multi-channel transmitter 30 are all orthogonal to each other, receive signals 25 are also orthogonal to each other. Accordingly, mutual interference is minimal and single channel measurement instrument 130 is able to separate or resolve each individual receive signal 25 to measure at least one characteristic of the corresponding RF receiver 22. In some embodiments, single channel measurement instrument 130 sequentially measures one or more characteristics of RF receivers 22-1 . . . 22-N, one at a time.

Figure 4:
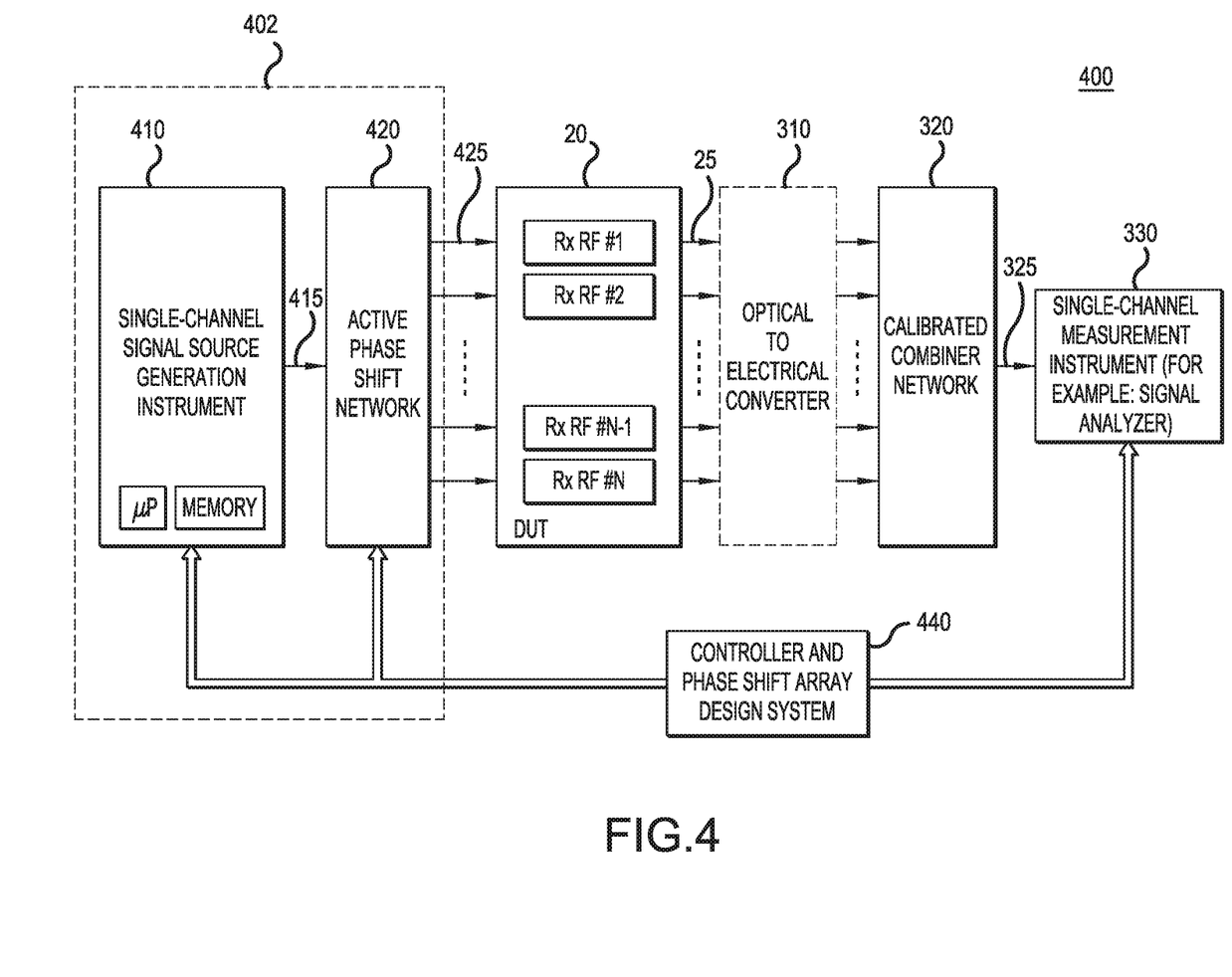
FIG. 4 illustrates a third example embodiment of a system for testing a multi-channel RF system or device under test (DUT).

FIG. 4 illustrates a third example embodiment of a test system 400 for testing a multi-channel RF device under test (DUT). As will be explained in greater detail below, a principal difference between test system 300 and test system 400 is the method of creating orthogonality between the RF test signals. Test system 300 uses baseband channel coding to achieve the orthogonality, while test system 400 employs phase shifting. Test system 400 includes a test signal generator 402, combiner network 320, single channel measurement instrument 330 and controller and phase shift array design system 440. Test system 400 may also further include, optionally, optical-to-electrical converter 310. In particular, test system 400 is an embodiment of a system for testing and/or calibrating a plurality of RF receivers of a multi-channel RF device or system, specifically a multi-channel RF communication device or system.

Whereas test system 300 described above assumed the availability of a calibrated multi-channel transmitter which could be configured to generate a plurality of RF test signals in parallel with each other, wherein at least one of the RF test signals is orthogonal to the other RF test signals at a given time, in contrast, test system 400 provides a test signal generator 402 which includes a single-channel signal source 410 and a phase shift network (e.g., an active phase shift network) 420 which cooperate to output a plurality of RF test signals 435 in parallel with each other, wherein at least one of the RF test signals 435 is orthogonal to the other RF test signals at a given time. Test signal generator 402 includes one or more interfaces to controller and phase shift array design system 440 for controlling operations thereof, as described below.

Single-channel signal source 410 is configured to generate and output a single channel signal 415, in particular an RF signal which carries baseband data, whose characteristics match those required for reception by RF receivers 22. Single-channel signal source 410 may generate single channel signal 415 in response to a signal design produced by controller and phase shift array design system 440.

In some embodiments, single-channel signal source 410 may include a digital microprocessor and memory, which may include volatile and/or nonvolatile memory, including random access memory (RAM), read only memory—for example electrically erasable programmable read only memory (EEPROM), FLASH memory, etc. In some embodiments, the memory may store instructions to be executed by the digital microprocessor to cause the digital microprocessor to perform one or more algorithms for generating single channel signal 415. Single-channel signal source 410 may also include firmware, one or more application specific integrated circuits (ASICs), digital signal processors (DSPs), programmable gate arrays, etc.

In some embodiments, single channel signal 415 may be designed by controller and phase shift array design system 440 and communicated therefrom to single-channel signal source 410. In some embodiments, controller and phase shift array design system 440 may comprise a general purpose computer including one or more digital microprocessors, memory (including volatile and/or nonvolatile memory), data storage (e.g., a hard disk or FLASH memory drive), one or more interfaces (e.g., an Ethernet port, wireless network interface, etc.) for communicating with test signal generator 402, and a user interface which may include one or more of a display, keyboard, keypad, touchscreen, mouse, trackball, microphone, etc. In some embodiments, a user may execute one or more software algorithms stored in memory and/or data storage of signal design system 140 to design or set parameters for single channel signal and may communicate this data to single-channel signal source 410. In some embodiments, the parameters necessary for generating single channel signal 415 may be stored in nonvolatile memory in single-channel signal source 410.

Single-channel signal source 410 is configured to supply single channel signal 415 to phase shift network 420 which may be an active phase shift network.

Phase shift network 420 is configured to receive single channel signal 415 and in response thereto to output a plurality of RF test signals 425 in parallel with each other, wherein phase shift network 420 is further configured to shift the phase of one or more of the RF test signals 425 so as to make at least a selected one of the RF test signals 425 orthogonal to the other RF test signals 425. In some embodiments, phase shift network 420 is configured to shift the phase of one or more of the RF test signals 425 so as to make all of the RF test signals 425 orthogonal to each other. Phase shift network 420 may be an active device that can shift the phase for all the RF test signals 425 independently according under the design and/or control of controller and phase shift array design system 440 to create some form of orthogonally among RF test signals 425.

DUT 20, combiner network 320, and single channel measurement instrument 330 are the same as the corresponding elements in test system 300 of FIG. 4, so a repeated description thereof will not be provided.

Figure 5:
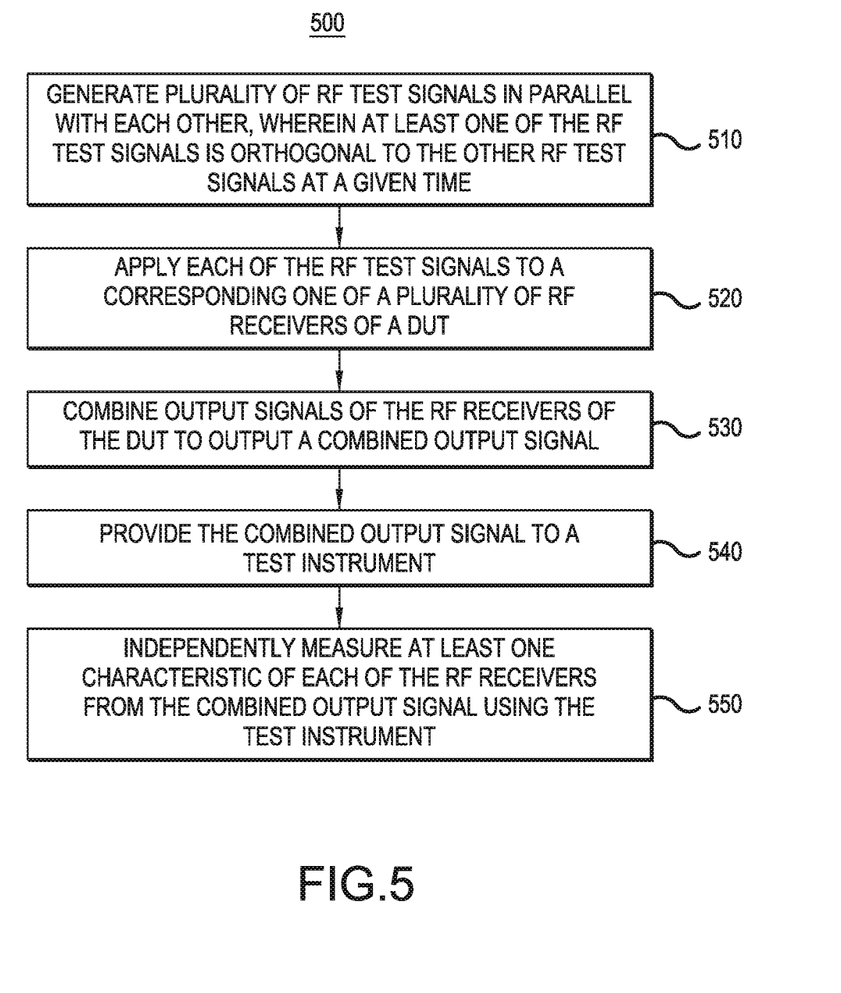
FIG. 5 is a flowchart of an example embodiment of a method of testing a multi-channel RF system or device under test (DUT).

FIG. 5 is a flowchart of an example embodiment of a method 500 of testing a multi-channel RF system or device. In some embodiments, method 500 may be employed to test and/or calibrate a plurality of RF receivers of a multi-channel RF device or system, specifically a multi-channel RF communication device or system, for example a massive multi-input, multi-output (MIMO) communication system. In some embodiments, method 500 may be performed by test system 300 or test system 400 to measure one or more characteristics of the receivers of DUT 20.

Method 500 includes an operation 510 of generating a plurality of RF test signals in parallel with each other, wherein at least one of the RF test signals is orthogonal to the other RF test signals at a given time.

Method 500 also includes an operation 520 of applying each of the RF test signals to a corresponding one of a plurality of RF receivers of a DUT such as RF receivers 22 of DUT 20 as shown in FIGS. 3 and 4 and described above.

Method 500 also includes an operation 530 of combining receive signals of the RF receivers of the DUT to output a combined output signal. In some embodiments, the receive signals may be combined via a combiner network, such as combiner network 320 as shown in FIGS. 3 and 4 and described above.

Method 500 also includes an operation 540 of providing the combined output signal to a test instrument (e.g., a measurement instrument).

Method 500 also includes an operation 550 of independently measuring at least one characteristic of each of the RF receivers from the combined output signal using the test instrument.

As described above in the background, in conventional testing approaches for multi-channel RF communication devices, one must either connect multiple test instruments, or a multi-channel test instrument, to multiple channels in order to measure the multiple channels quickly but expensively, or one can switch a single test instrument from channel to channel in order to measure multiple channels slowly but inexpensively. In contrast, with embodiments of test systems described herein a single test instrument may be employed, which is comparatively inexpensive, but it still allows the channel selection to be done electronically, bringing nearly the same speed as if multiple test instruments were employed but at a much lower cost.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A test system, comprising:
 a test signal generator, comprising:
  a single channel signal source configured to output a single channel signal, and
  a phase shift network configured to receive the single channel signal and in response thereto to output a plurality of RF test signals in parallel with each other, wherein the phase shift network is further configured to shift a phase of one or more of the RF test signals so as to make at least a selected one of the RF test signals orthogonal to the other RF test signals;
 a combiner network having a plurality of inputs each configured to receive one of a plurality of receive signals, each receive signal being produced from a corresponding one of a plurality of RF receivers of a device under test (DUT) in response to the RF test signals, wherein the combiner network is configured to combine the plurality of receive signals and to output a combined output signal; and
 a single channel measurement instrument configured to receive the combined output signal and to measure therefrom at least one characteristic of each of the RF receivers.

2. The test system of claim 1, further comprising an optical-to-electrical converter connected between outputs of each of the plurality of RF receivers of the DUT and the inputs of the combiner network.

3. The test system of claim 1, wherein the phase shift network is an active phase shift network.

4. The test system of claim 3, wherein the single channel signal source and the phase shift network are configured to output the plurality of RF test signals in parallel with each other.

5. The test system of claim 4, at least one of the RF test signals is orthogonal to the other RF test signals at a given time.

6. The test system of claim 3, wherein the active phase shift network comprises an active device adapted to shift the phase for all the RF test signals independently to create at least some orthogonality among RF test signals.

7. The test system of claim 1, wherein the single channel signal is an RF signal which carries baseband data.

8. The test system of claim 7, wherein characteristics of the baseband data match those required for reception by the plurality of RF receivers.

9. The test system of claim 1, wherein the phase shift network is further configured to shift the phase of one or more of the RF test signals to make all of the RF test signals orthogonal to each other.

10. A test system, comprising:
 a test signal generator, comprising: a single channel signal source, comprising a processor and a memory, which stores instructions, which when executed by the processor cause the processor to:
 generate a plurality of radio frequency (RF) test signals in parallel with each other, wherein at least one of the RF test signals is orthogonal to the other RF test signals at a given time;

apply each of the plurality of RF test signals to a corresponding one of a plurality of RF receivers of a device under test (DUT);
combine a plurality of receive signals each produced from one of the plurality of RF receivers of the DUT in response to the corresponding one of the plurality of RF test signals, to output a combined output signal;
provide the combined output signal to a test instrument; and
employ the test instrument to independently measure at least one characteristic of each of the plurality of RF receivers from the combined output signal.

11. The test system of claim 10, wherein a transmitter of the DUT generates the plurality of RF test signals in parallel with each other.

12. The test system of claim 11, wherein the transmitter of the DUT outputs the plurality of RF test signals which are orthogonal to each other.

13. The test system of claim 11, wherein the instructions, which when executed by the processor to generate the plurality of RF test signals in parallel with each other further, further causes the processor to:
output a single channel signal from a single channel source; and
output from a phase shift network the plurality of RF test signals in parallel with each other in response to the single channel signal.

14. The test system of claim 13, wherein the instructions, which when executed by the processor, further cause the phase shift network to shift a phase of one or more of the RF test signals so as to make at least one of the RF test signals orthogonal to the other RF test signals.

15. The test system of claim 14, wherein the instructions, which when executed by the processor, further cause the phase shift network to sequentially shift the phase of each of the RF test signals so as to sequentially make each of the RF test signals orthogonal to the other RF test signals.

16. A tangible, non-transitory computer readable medium that stores instructions, which when executed by a processor, cause the processor to:
generate a plurality of radio frequency (RF) test signals in parallel with each other, wherein at least one of the RF test signals is orthogonal to the other RF test signals at a given time;
apply each of the plurality of RF test signals to a corresponding one of a plurality of RF receivers of a device under test (DUT);
combine a plurality of receive signals each produced from one of the plurality of RF receivers of the DUT in response to the corresponding one of the plurality of RF test signals, to output a combined output signal; and
provide the combined output signal to a test instrument.

17. The tangible non-transitory computer readable medium of claim 16, wherein a transmitter of the DUT generates the plurality of RF test signals in parallel with each other.

18. The tangible non-transitory computer readable medium of claim 17, wherein the transmitter of the DUT outputs the plurality of RF test signals which are orthogonal to each other.

19. The tangible non-transitory computer readable medium of claim 17, wherein the instructions that cause the processor to generate the plurality of RF test signals in parallel with each further cause the processor to:
output a single channel signal from a single channel signal source; and
output the plurality of RF test signals from a phase shift network in parallel with each other in response to the single channel signal, wherein a phase of one or more of the RF test signals is shifted so as to make at least one of the RF test signals orthogonal to the other RF test signals.

20. The tangible non-transitory computer readable medium claim 16, wherein the instructions further cause the shift in the phase of each of the RF test signals to be sequential so as to sequentially make each of the RF test signals orthogonal to the other RF test signals.

* * * * *